June 28, 1927.

W. A. CHRYST 1,633,925

ENGINE STARTING APPARATUS

Filed March 17, 1925

Inventor
William A. Chryst
By Spencer Small & Hardman
his Attorneys

Patented June 28, 1927.

1,633,925

UNITED STATES PATENT OFFICE.

WILLIAM A. CHRYST, OF DAYTON, OHIO, ASSIGNOR, BY MESNE ASSIGNMENTS, TO DELCO-REMY CORPORATION, OF DAYTON, OHIO, A CORPORATION OF DELAWARE.

ENGINE-STARTING APPARATUS.

Application filed March 17, 1925. Serial No. 16,206.

This invention relates to starting apparatus for internal-combustion engines and includes among its objects improvements in construction which are conducive to durability, reliable performance, and economy in manufacture.

Further objects and advantages of the present invention will be apparent from the following description, reference being had to the accompanying drawings, wherein a preferred form of embodiment of the present invention is clearly shown.

Figure 1:
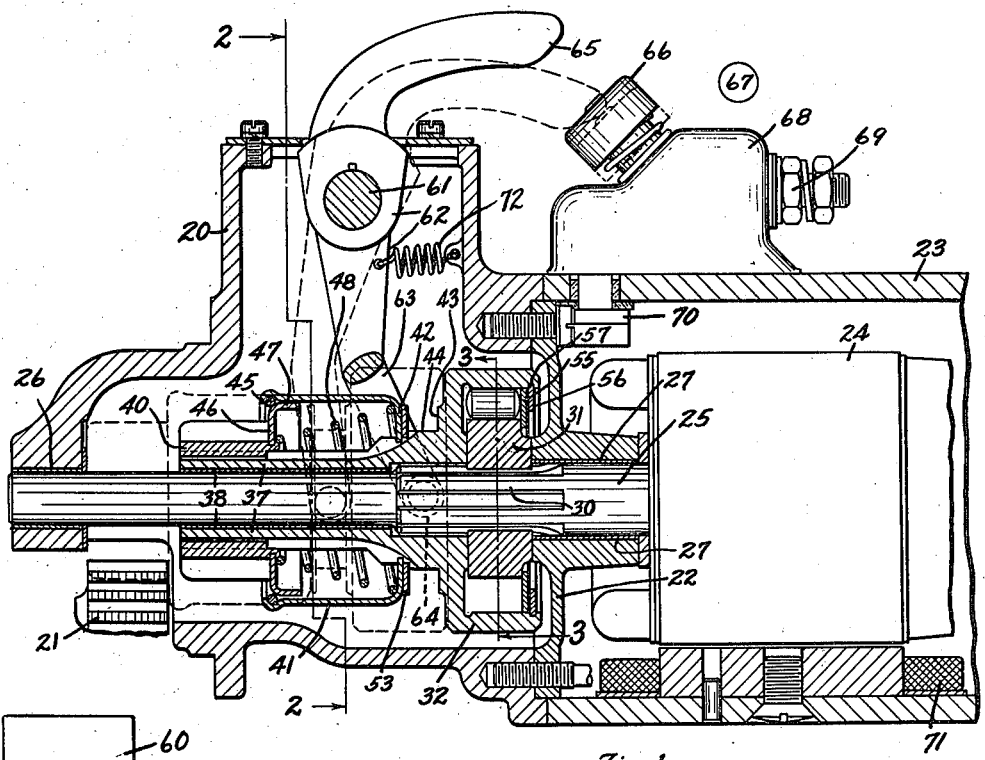
Fig. 1 is a longitudinal sectional view of a starting apparatus embodying the present invention.
Figure 2:
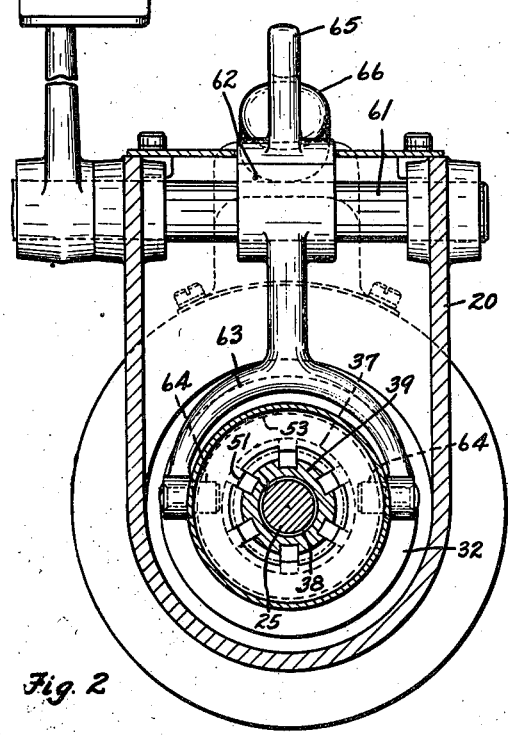
Fig. 2 is a sectional view taken on the line 2—2 of Fig. 1.

The starting apparatus includes a bracket 20 for mounting the starting motor upon the frame of the engine to be started. The engine is not shown but is represented by a gear 21 connected with the engine, such as the flywheel gear. The bracket 20 provides a gear housing, and to it are attached end frame 22 and the field frame 23 of an electric motor which includes also an armature 24 mounted upon a shaft 25 which is supported by bearing 26 provided by the bracket 20 and by a bearing 27 provided by the end frame 22. The right end of the field frame 23 supports another end frame not shown, which is also provided with a bearing for the shaft 25.

Figure 3:
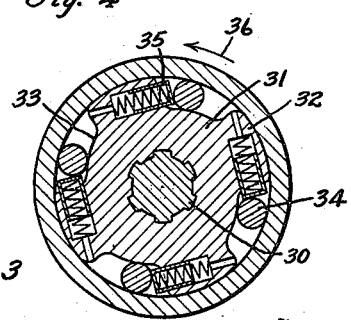
Fig. 3 is a sectional view on the line 3—3 of Fig. 1.

That portion of the shaft 25 immediately to the left in Fig. 1 of the end frame 22 is fluted to provide splines 30 with which the inside or caming member 31 of an overrunning clutch is connected for rotation with the shaft 25 and sliding movement along the shaft. The cam 31 is enclosed by clutch shell member 32 and is notched to provide a plurality of camming surfaces 33 each of which cooperate with a roller 34 to transmit motion from the cam 31 to the shell 32 when the rotation of the shaft 25 is counterclockwise as viewed in Fig. 3, or counterclockwise looking toward the left end of shaft 25 in Fig. 1. Each roller 34 is urged by a spring pressed plunger 35 toward the narrower part of the recess bounded by the interior wall of the shell and the clutch camming surface 33. Obviously, the shell 32 may overrun the cam 31 in a direction of the arrow 36 in Fig. 3. A sleeve 37 having a bearing 38 journalled upon the shaft 25 is formed preferably integrally with the shell 32. Sleeve 37 is fluted to provide splines 39 with which the hub of a pinion 40 is connected for rotation with the sleeve 37 and sliding movement relative thereto. Pinion 40 is adapted to mesh with and to drive the engine gear 21. A tube 41 surrounds the sleeve 37 and is provided at one end with an inwardly extending annular flange 42 which is connected with the sleeve 37 but is spaced from the end wall 43 of the clutch shell 32 to provide an annular groove 44. Adjacent its left hand end as viewed in Fig. 1, the tube 41 is provided with an annular groove which receives a resilient wire split ring 45. When this ring is in position its internal diameter is less than the internal diameter of the tube 41. To the hub of the pinion 40 there is attached a disc 46 having an annular flange 47 which is slidable within the tube 41. The external diamter of flange 47 is greater than the internal diameter of ring 45. A coiled spring 48 is located between the disc 46 and the flange 42 and normally tends to maintain the disc 46 against the ring 45.

Figure 4:
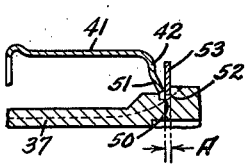
Fig. 4 is a sectional view of certain parts shown in Fig. 1, but showing a step in the process of assembling these parts.

In order to attach the tube 41 to the sleeve 37, the sleeve is provided with an annular groove 50 and the annular flange 42 of tube 41 is formed with a conical annular portion 51 having an internal diameter slightly greater than the external diameter of that portion of the sleeve 37 over which the flange 51 must slide before arriving at the groove 50. In order that the flange 51 may be forced into the groove 50, the sleeve 37 is provided with a shoulder 52 for receiving a disc or backing plate 53 having a thickness substantially equal to the distance A in Fig. 4 between the shoulder 52 and the groove 50. The flange 51 is forced against the plate 53 so that it will eventually lie in the same plane as the remainder of the flange 42 and will be forced into the groove 50. The amount of material comprising the flange 51 is calculated so that when the flange 51 is forced into the groove 50, the flange 51 will contract tightly about the sleeve 37.

In order that the clutch members 31 and 32 may be moved as a unit along the shaft 25, a retaining disc 55 is located within the shell 32 and against the cam 31, and is retained by a split ring 56 of resilient material which is sprung into an annular groove 57 provided in the shell 32.

The mechanism for moving the clutch members and the pinion comprises a pedal 60 which is attached to a shaft 61 supported by the bracket 20. Shaft 61 carries a lever 62 provided with a fork 63 carrying rollers 64 which are received by the groove 44 which is provided between the clutch shell 32 and the plate 53. The lever 62 is provided with an arm 65 adapted to engage a plunger 66 for the closing of the contacts of motor switch 67 having casing 68 mounted upon the motor frame 23. The casing supports a terminal 69 adapted to be connected with a wire leading to the battery or other current source. The field frame 23 supports a switch terminal 70 which is adapted to be connected with the motor field windings, one of which is indicated at 71. A spring 72 tends to maintain the lever 62 in the position shown in Fig. 1.

To start the engine the pedal 60 is pressed to cause the shaft 61 to rotate clockwise as viewed in Fig. 1. This causes the lever 62 to operate to move the clutch and pinion toward the left as viewed in Fig. 1 so that the pinion 40 will be brought into mesh with the engine gear and the motor switch will be closed, as indicated by broken lines in Fig. 1. During meshing of the pinion with the engine gear motion is transmitted from the lever 62 to the pinion 40 through spring 48.

When the engine becomes self operative the pedal 60 is released so that the spring 72 will return the lever 62 and the clutch and sleeve members to the position shown in Fig. 1. During the demeshment thereof motion is transmitted to the pinion 40 from the lever 62 through the tube 41, ring 45 and disc 46.

In case the operator should fail to release the pedal 60 immediately after the engine becomes self operative, no harm will be done because the pinion is free to turn independently of the motor shaft 25. It is found preferable to construct the device so that the clutch shell member will be the overrunning member of the clutch instead of the inside camming member. If the clutch camming member were connected with the pinion instead of with the motor shaft, it would be more difficult to release the clutch members promptly when the engine becomes self operative because the movement of the rollers 34 to nonclutching position would be hindered as the result of centrifugal force operating upon the rollers when the pinion is rotated at high speed by the engine.

In case the teeth of the pinion 40 should abut the ends of the teeth of gears 21 when the pedal 60 is depressed, the spring 48 will yield and be compressed beyond its initial state of compression in order that the lever 65 may be moved into position for closing the motor switch. As soon as the motor turns the shaft 25 to register the teeth of pinion 40 for meshing with the gear 21, the spring 48 will be released quickly to snap or jump the pinion into substantial engagement with the gear 21. The construction is such that the mass to be accelerated by the spring 48 is made very small, namely, the mass represented by the weight of the pinion 40 and the disc 46; therefore, the pinion 40 will have been moved into a position of substantial engagement with the gear 21 before the motor attains full speed. In this way breakage of the gear teeth due to the meshing of the pinion therewith after the motor switch is closed, will be materially reduced.

While the form of embodiment of the present invention as herein disclosed, constitutes a preferred form, it is to be understood that other forms might be adopted, all coming within the scope of the claims which follow.

What is claimed is as follows:

1. Engine starting apparatus comprising, in combination, a motor, a shaft driven by the motor, an overrunning clutch connected with the shaft for rotation therewith and sliding movement thereon, a pinion including a hub splined to the clutch and adapted to mesh with a gear of the engine to be started, and means for moving the clutch along the shaft.

2. Engine starting apparatus comprising, in combination, a motor, a shaft driven by the motor, an overrunning clutch including a shell member, a cam member within the shell and rollers between the clutch members, said cam member being connected with the shaft for rotation with the shaft and sliding movement thereon, a pinion adapted to mesh with a gear of the engine to be started and splined on the clutch shell member so as to rotate therewith and be slidable thereon, and means for moving the clutch along the shaft.

3. Engine starting apparatus comprising, in combination, a motor, a shaft driven by the motor, an overrunning clutch connected with the shaft for rotation therewith and sliding movement thereon; a pinion adapted to mesh with a gear of the engine to be started and connected with the clutch for rotation therewith and sliding movemer: relative thereto, a spring for transmittin; motion from the clutch to the pinion to effect the meshing of the pinion with the engine gear, means for transmitting motion in the opposite direction from the clutch to the pinion, and means for moving the clutch and pinion.

4. Engine starting apparatus comprising, in combination, a motor, a shaft driven by the motor, an overrunning clutch connected with the shaft for rotation therewith and sliding movement thereon, a sleeve connected with the clutch and slidable upon said shaft, a pinion splined upon the sleeve and adapted to mesh with a gear of the engine to be started, a spring surrounding the sleeve and located between the clutch and pinion for transmitting motion from the clutch to the pinion in one direction, means surrounding spring for transmitting motion from the clutch to the pinion in the opposite direction, and means for moving the clutch and pinion.

5. Engine starting apparatus comprising, in combination, a motor, a shaft driven by the motor, an overrunning clutch including a shell member, a cam member within the shell and rollers between the clutch members, said cam member being connected with the shaft for rotation with the shaft and sliding movement thereon, a sleeve connected with the clutch shell and slidable along the shaft, a pinion adapted to mesh with a gear of the engine to be started and splined upon the sleeve, a spring surrounding the sleeve and located between the clutch and pinion for transmitting motion from the clutch to the pinion in one direction, means surrounding spring for transmitting motion from the clutch to the pinion in the opposite direction, and means for moving the clutch and pinion.

6. Engine starting apparatus comprising, in combination, a motor, a shaft driven by the motor, an overrunning clutch connected with the shaft for rotation therewith and sliding movement thereon, a sleeve connected with the clutch and slidable along the shaft, a pinion adapted to mesh with a gear of the engine to be started and splined upon the sleeve, a tube surrounding the sleeve and having adjacent one end thereof an annular flange attached to the sleeve and spaced from an end wall of the clutch to form an annular groove, an annular member carried at the other end of the tube and having an internal diameter less than the internal diameter of the tube, a disc attached to the pinion and slidable within the tube and having an external diameter greater than the internal diameter of said annular member whereby separation of the pinion from the clutch is limited, a spring between the pinion and tube flange, and a manually operable member cooperating with said annular groove for moving the clutch.

In testimony whereof I hereto affix my signature.

WILLIAM A. CHRYST.